UNITED STATES PATENT OFFICE.

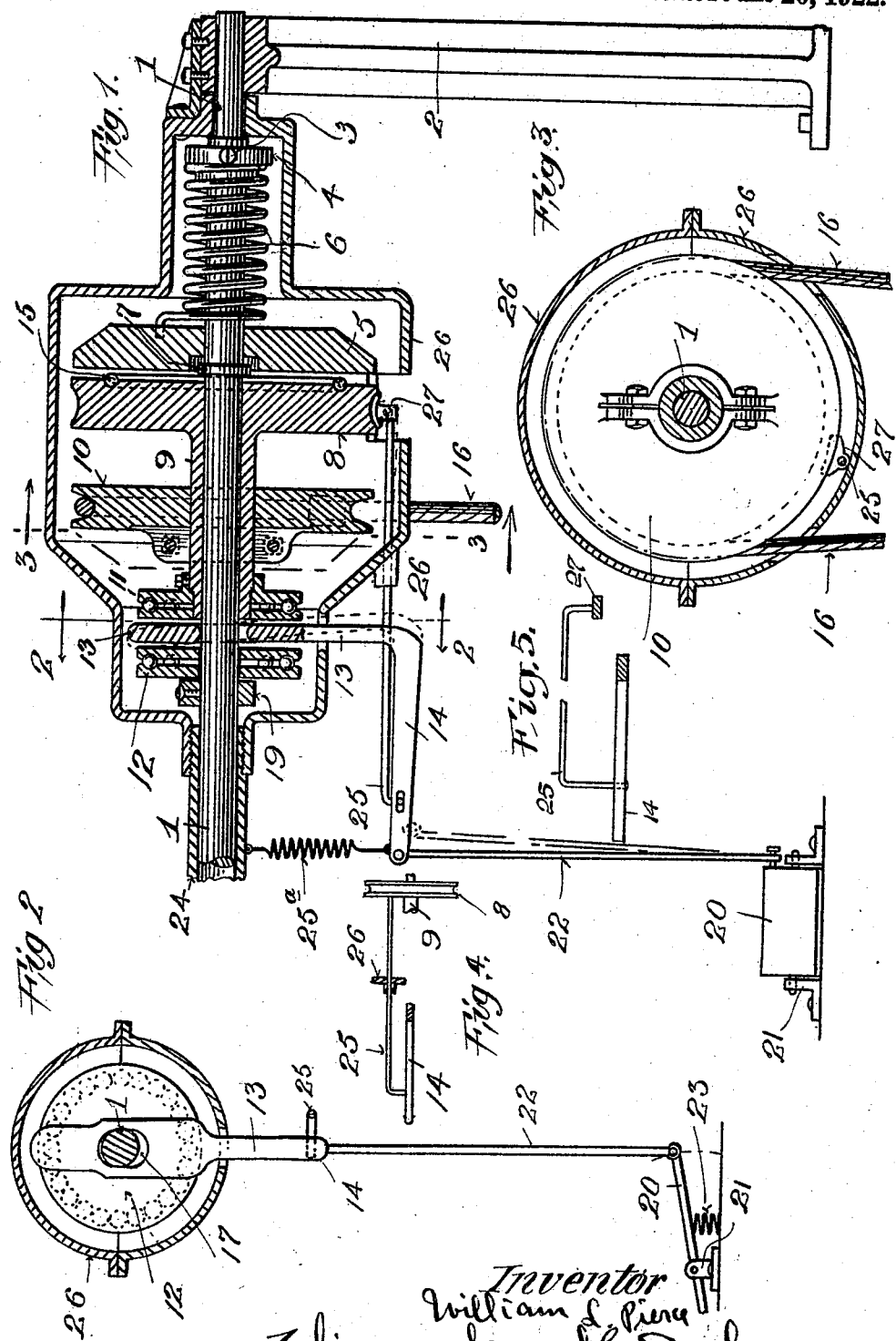

WILLIAM L. PIERCE, OF NEW YORK, N. Y.

FRICTION-CLUTCH MECHANISM.

1,420,214.

Specification of Letters Patent. Patented June 20, 1922.

Application filed April 12, 1917. Serial No. 161,464.

*To all whom it may concern:*

Be it known that I, WILLIAM L. PIERCE, a citizen of the United States, residing at New York, in the county and State of New York, have made a certain new and useful Invention in Friction-Clutch Mechanism, of which the following is a specification.

This invention relates to friction clutch mechanism, for use in any connection where a clutch between a moving shaft and a stationary shaft, to impart the motion of the one to the other at will, is required.

The object of the invention is to provide a friction clutch, which is simple in structure, efficient in operation and economical in manufacture.

A further object of the invention is to provide a yielding connection in a friction clutch.

A further object of the invention is to provide a friction clutch wherein the friction material employed is not subjected to enormous heat incident thereto, due to the wide diversity between the rotating and stationary members thereof.

Further objects of the invention will appear more fully hereinafter.

The invention consists substantially in the construction, combination, location and relative arrangement of parts, all as will be more fully hereinafter set forth, as shown by the accompanying drawing and finally pointed out in the appended claims.

Referring to the drawing:—

Fig. 1 is a view in side elevation, partially in section, of a friction clutch embodying my invention.

Fig. 2 is a sectional view taken on the line 2, 2, in Fig. 1, looking in the direction of the arrows.

Fig. 3 is a sectional view taken on the line 3, 3, Fig. 1 looking in the direction of the arrows.

Fig. 4 is a diagrammatic view showing the brake employed in connection with my invention.

Fig. 5 is a detached view partially in section, showing the relation between the brake and the control lever.

The same part is designated by the same reference numeral wherever it occurs throughout the several views.

In friction clutch devices, to impart at will, rotary movement to a member or members, from a continually rotating member, great difficulty has heretofore been encountered, due to the fact that the continually rotating member, rotating at great speed, burns out the friction material when the stationary member is forced in contact therewith. This is obvious when it is considered that the difference in speed between the two members is great. The heat created by the frictional contact between the stationary member, and the rapidly rotating moving member, quickly wears down the frictional material used in clutches of this nature, and burns it out, thereby necessitating frequent inspection and replacement of the friction material employed.

It is among the special purposes of my present invention to provide a friction clutch, which may be used in any instance where a friction clutch is desired or is employed, and wherein a yielding initial connection is made between the stationary and the rotating member. In accordance with my invention neither of the members above referred to are connected directly to the rotating shaft. The rotating member is connected to the rotating shaft by a coiled spring mounted on the shaft, and is rotated by the shaft thereby, so that when the stationary member is placed in frictional contact with the rotating member, the shock or strain imposed upon the frictional surface due to the great difference in speed between the two members is absorbed and taken up by the coiled spring.

Referring to Fig. 1 of the drawing, 1 designates the shaft which may be rotated from any desired source in any suitable manner; and in this instance, referring to the sectional views, Figs. 2 and 3, is rotated counter clockwise; the shaft is operated in suitable bearings 2 at its respective ends and of which bearings one is shown. Mounted on the shaft, and secured thereto, to rotate therewith, for example, by set screw 3, is a collar 4. Loosely mounted on the shaft 1 is a rotating member 5 which forms a portion of the friction clutch. A coiled spring 6 is secured at one end to the collar 4 and at the other end to the rotating member 5, which coiled spring is slightly larger in internal diameter than the external diameter of the shaft 1, as clearly shown in Fig. 1. The collar 7, mounted on the shaft 1, limits the outward movement of the rotating member 5, due to the tension of the spring 6. The other section of the friction clutch, which is designated at 8, is loosely mounted on the shaft 1, and is provided with an extended hub sleeve 9. Mounted on the hub sleeve 9 of the member 8 and suitably secured thereto, to rotate therewith, is a member 10, which member will hereinafter be referrer to as the attached member. Secured to the end of the hub sleeve 9 is a ball-bearing collar 11. A second ball-bearing collar 12 is loosely mounted on the shaft 1, as shown, and positioned between the two ball-bearing collars 11 and 12, and loosely carried by the shaft 1 is a collar, or a collar member, 13 of comparatively larger internal diameter than the external diameter of the shaft 1, the end of which collar is bent to form an arm 14, for the control of the clutch, as will be more fully hereinafter described.

To enhance the frictional contact between the rotating member 5 and the member 8, a suitable frictional material, such as leather or the like, and indicated at 15, may be located on one of these members. I have shown this friction piece in the form of a circular ring, carried by the member 8, but it will be understood that my invention, in its broad scope, as defined in the claims, is not to be limited or restricted to the shape, size or location or use of the additional friction strip shown.

It will be seen that when the collar 11 is forced to the right in the drawing, member 8 will be forced into contact with the rotating member 5, which is being rotated at the same speed of rotation as the shaft 1, through the spring 6. The engagement of the member 8 with the member 5, however, causes the member 5 to slacken in speed of rotation against the action of the spring 6, which, due to its larger size, winds tightly around the shaft 1 until its limit is reached, before the speed of rotation of the shaft 1 is imparted to the member 8, thereby using the frictional connection between the two members 8 and 5 and decreasing the possibility of slippage and the frictional heat generated thereby before the gripping action is secured between the two members and the same or substantially the same speed of rotation is secured. The attached member 10 may control any machine or apparatus desired to be operated at will, and for the purpose, I have shown the member 10 in the form of a pulley, around which may operate the belt or similar operating medium 16.

I will now describe the means employed for operating the clutch at will. As above described the arm 14 is formed with the collar 13 loosely mounted on shaft 1. It will be obvious that when the arm 14 is pulled downwardly the opening 17 of the collar 13 allows the collar 13 to rock about the shaft 1 as a fulcrum and bear against the ball-bearing collar 12, the movement of which is limited by the collar 19 secured to the shaft, and also against the ball-bearing collar 11, thereby forcing the collar 11, hub sleeve 9 and member 8 of the attached member 10 to the right, thus securing the frictional engagement between the member 8 and the rotating member 5. To actuate the lever or arm 14 forming part of the collar 13 any desired means may be employed. For illustrative purposes, I have shown what may be termed a foot pedal control, which pedal is indicated at 20 and is mounted on fulcrum brackets 21, which pedal is connected in any suitable way to the arm 14, for example by a rod 22, pivotally connected to the pedal 20 and the arm 14, as shown. It is desirable in devices of this nature to insure disengagement of the friction clutch members automatically. Any suitable means may be employed for this purpose and I show a spring 23 located beneath the foot pedal, which spring, when pressure on the pedal 20 is removed, forces the pedal upwardly to its normal position and thereby through rod connection 22, causes the arm 14 and its collar 13 to assume its normal position between the ball-bearing collars 11 and 12 as shown, thereby releasing the pressure on collar 11 and allowing the clutch member 5 to force the clutch member 8 out of contact therewith. If desired, and as an alternative construction, the end of the arm 14 may be secured to the sleeve 24 of shaft 1 by means of a spring 25$^a$, which will restore the arm 14 to its normal position when the pressure thereon is removed. The spring 25$^a$ may be employed either separately or in addition to the spring 23 hereinbefore described.

It will be observed that when the friction member 8 is forced towards the cooperating member 5, the latter is slightly displaced along the shaft 1 and away from the stop collar 7, against the compression tension of spring 6. The thrust of this movement of the members 5, 8, is taken at one side by the collar 4, and at the other side by collar 19, the thrusts on these collars being equal and in opposite directions. The result is that the shaft 1 is entirely relieved of end thrust, in either direction. When the thrust of member 8 towards member 5 is released the compressive tension of spring 6 restores the member 5 to position against stop collar 7, and thereby restores the member 8 to its normal retracted idle position.

It is also frequently desirable to brake the member 8 immediately on disconnection with the rotating member 5, to bring the member 10 to rest, and to automatically operate the brake immediately upon disconnecting the friction members 5 and 8. I show one simple means for accomplishing this, which means is controlled by the operation of the member 14, so that when the member 14 is in its normal position, as indicated in Fig. 1 the brake is in place and bearing against the member 8. I accomplish this by securing to the arm 14 an angle rod 25, which angle rod has an actual axial rotative bearing in the casing 26, and has secured at the end thereof, a brake 27, which brake is turned into and out of engagement with the member 8, according to the actual axial movement of the angle rod 25, as will be clearly understood. It will be noticed on reference to Fig. 3 that the rod 25 is offset relative to the longitudinal center of the assembly so that with its parallel arms shown in Fig. 5 connected one to the operating arm 14 and the other supporting the brake 27, the brake 27 is moved into or out of engagement with the member 8 when the arm 14 is rocked about its pivotal support on the shaft 1. Thus, when the arm 14 is in its normal position, the brake 27 is in engagement with the member 8, and when the arm 14 is depressed, to thereby make frictional engagement between the clutch members, the rod 25 is axially rotated thereby, withdrawing the brake 27 from the member 8 to allow the free rotation thereof. The casing 26 forms a dirt and dust-proof casing for the moving parts, and in addition renders the clutch device safe in operation by completely enclosing all moving parts thereof.

While I have shown and described a specific structure embodying the principles of my invention, I wish it to be understood that my invention is not to be limited or restricted to the specific details of construction thereof as many changes and modifications will readily occur to those skilled in the art, without departing from the spirit or scope of my invention, as defined in the claims.

Therefore, having set forth the object and nature of my invention, what I claim as new and useful, and of my own invention, and desire to secure by Letters Patent, is:—

1. In a friction drive mechanism, a power driven shaft, a collar carried by said shaft to rotate therewith, a member loosely mounted on said shaft, a spring coil surrounding said shaft and connected at one end to said collar and at the other end to said member, to exert both its compression and its torsional tensions upon said member, a stop on said shaft to limit the movement of said member under the influence of the compression tension of said coil, a cooperating member mounted on said shaft, means to move said cooperating member into frictional engagement with said first mentioned member, and driving means actuated by said cooperating friction member.

2. A clutch device comprising a rotary shaft, a clutch member flexibly mounted on said shaft, and secured thereto through the medium of a spring coiled loosely about the shaft, and having one end secured thereto, a co-operating auxiliary clutch member freely mounted on said shaft, means on said shaft for exerting an end thrust upon said auxiliary clutch member to force the same into yielding frictional engagement with said first mentioned clutch member, a power transmitting device carried by said co-operating auxiliary clutch member, and secured thereto, and means for controlling the motion of said auxiliary clutch member.

3. In a friction drive mechanism, a power driven shaft, a collar carried by said shaft to rotate therewith, a member loosely mounted on said shaft, a spring coil surrounding said shaft and connected at one end to said collar and at the other end to said member, to exert both its compression and its torsional tensions upon said member, a cooperating member mounted on said shaft, a second collar fixed on said shaft, said members disposed between said collars, means to shift said cooperating member into surface frictional engagement with said first mentioned member, the thrust of said means being taken in opposite directions by said collars, and driving means actuated by said cooperating friction member.

4. In a friction drive mechanism, a power driven shaft, a collar carried by said shaft to rotate therewith, a member loosely mounted on said shaft, a spring coil surrounding said shaft and connected at one end to said collar and at the other end to said member, to exert both its compression and its torsional tensions upon said member, a cooperating member mounted on said shaft, a second collar fixed on said shaft, said members disposed between said collars, a lever suspended upon said shaft for rocking movement in the direction of the length of the shaft, and interposed between said second collar and said cooperating member, and adapted, when actuated, to shift said cooperating member into surface frictional engagement with said first mentioned member, the thrust of said lever being imposed in opposite directions upon said collars, and driving means actuated by said cooperating friction member.

5. In a friction drive mechanism, a power driven shaft, a collar carried by said shaft to rotate therewith, a member loosely mounted on said shaft, a spring coil surrounding said shaft and connected at one end to said collar and at the other end to said member, to exert both its compression and its torsional tensions upon said member, a cooperating member mounted on said shaft, a second collar fixed on said shaft, said members disposed between said collars, a lever suspended upon said shaft for rocking movement in the direction of the length of the shaft, bearing members disposed at opposite sides of said lever, one of said bearing members being resisted by said second collar, and the other connected to said cooperating member, whereby when said lever is rocked said cooperating member is shifted into surface frictional engagement with said first mentioned member, and driving means actuated by said cooperating friction member.

In testimony whereof I have hereunto set my hand on this 30th day of March, A. D., 1917.

WILLIAM L. PIERCE.